(12) United States Patent
Weber et al.

(10) Patent No.: US 8,856,506 B2
(45) Date of Patent: *Oct. 7, 2014

(54) PROCESS FOR JOINING A COMPUTER TO A DIRECTORY BASED ON EITHER A NEWLY CREATED COMPUTER ACCOUNT OR RENEWED COMPUTER ACCOUNT DEPENDING ON A UNIQUE IDENTIFIER ASSOCIATED WITH AN END-USER

(71) Applicant: Hewlett-Packard Development Company, L.P., Houston, TX (US)

(72) Inventors: Jens Weber, Attdorf Baden-Wuerttemberg (DE); David Nutt, Bracknell Berkshire (DE); Jonathan Ott, Houston, TX (US); Jonathan Michael Hale, Swansea South Wales (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/214,028

(22) Filed: Mar. 14, 2014

(65) Prior Publication Data
US 2014/0201515 A1 Jul. 17, 2014

Related U.S. Application Data

(63) Continuation of application No. 13/126,436, filed on Apr. 27, 2011, now Pat. No. 8,762,701.

(51) Int. Cl.
*G06F 9/00* (2006.01)
*G06F 15/177* (2006.01)
*G06F 9/44* (2006.01)
*G06F 9/445* (2006.01)

(52) U.S. Cl.
CPC ............. *G06F 9/4401* (2013.01); *G06F 8/63* (2013.01)
USPC ............................... 713/2; 717/168

(58) Field of Classification Search
CPC ................ G06F 9/4401; G06F 8/63
USPC ............................................. 713/2
See application file for complete search history.

(56) References Cited

U.S. PATENT DOCUMENTS

2003/0051128 A1* 3/2003 Rodriguez et al. ............ 713/100
2004/0073787 A1* 4/2004 Ban et al. ...................... 713/159

(Continued)

FOREIGN PATENT DOCUMENTS

| CN | 1272649 | 11/2000 |
| CN | 1399194 | 2/2003 |
| CN | 101051278 | 10/2007 |

OTHER PUBLICATIONS

International Search Report in corresponding PCT patent application PCT/US2009/031889, dated Jul. 31, 2009.

(Continued)

*Primary Examiner* — Thomas Lee
*Assistant Examiner* — Robert Cassity

(57) ABSTRACT

A user-friendly system, method, and program product for installing an image on a computer, the method comprising: booting the computer (400) from an image source; receiving first information from an end-user of the computer (400), wherein the first information is at least one unique identifier associated with the end-user; obtaining automatically second information associated with the end-user based on the first information; determining automatically if there is an existing record associated with the computer based on the second information; renewing automatically, if there is an existing record associated with the computer, a computer account in a directory service based on the existing record; creating automatically, if there is not an existing record associated with the computer, a new computer account in the directory service; installing automatically the image to the computer; and joining automatically the computer to directory service domain based on the newly created computer account or based on the renewed computer account.

18 Claims, 4 Drawing Sheets

(56) References Cited

U.S. PATENT DOCUMENTS

2005/0091348 A1* 4/2005 Ferri et al. .................... 709/220
2005/0160420 A1* 7/2005 Kruta et al. ................... 717/174
2005/0278461 A1 12/2005 Ohta
2007/0283346 A1 12/2007 Delgrosso et al.
2008/0040714 A1 2/2008 Wheeler
2008/0141244 A1 6/2008 Kelley

OTHER PUBLICATIONS

Chinese Search Report (Translation) cited in Appl. No. 200980142797.6 issued in OA 4mo. dated Nov. 23, 2012; 3 pages.

* cited by examiner

PROCESS FOR JOINING A COMPUTER TO A DIRECTORY BASED ON EITHER A NEWLY CREATED COMPUTER ACCOUNT OR RENEWED COMPUTER ACCOUNT DEPENDING ON A UNIQUE IDENTIFIER ASSOCIATED WITH AN END-USER

CROSS-REFERENCE TO RELATED APPLICATIONS

This application claims priority to International PCT Patent Application No. PCT/US2008/081348 filed Oct. 27, 2008, the disclosure of which is incorporated herein by reference in its entirety.

FIELD OF THE INVENTION

Various embodiments relate to the field of software installation. More specifically, various embodiments relate to a user enabled desktop that improves and simplifies the software installation experience.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

New computer setup and re-imaging is a process conducted on computing devices associated with various types of businesses and organizations, as well as personal users. Generally, due to the numerous steps and technical knowledge required, such a process is conducted by information technology (IT) personnel associated with an organization. The IT personnel can either physically conduct the setup at the location of an end-user's computing device or, alternatively, guide the end-user through the setup procedure via one or more helpdesk phone calls. Either process is time consuming and depletes IT resources, especially in the case of an organization that is geographically dispersed across numerous regions. Still further, such a process requires an end-user to wait on the phone with a help desk or standby while IT personnel works on their computer. Such downtime is inefficient and costly for large organizations and as well as small organizations.

Furthermore, with the increased amount of end-users working from home, there is an additional challenge of enabling imaging and personalization processes from locations other than the inoffice Intranet environment. Besides the logistical issues, other challenges such as the organization's firewall or slow Internet connectivity make imaging and personalization of a computing device located outside the inoffice Intranet environment difficult.

The invention as disclosed herein aims to alleviate at least some of the above discussed problems.

SUMMARY OF THE INVENTION

In accordance with one embodiment, a method of installing an image on a computer is provided. The method comprising booting the computer from an image source; receiving first information from an end-user of the computer, wherein the first information is at least one unique identifier associated with the end-user; obtaining automatically second information associated with the end-user based on the first information; determining automatically if there is an existing record associated with the computer based on the second information; renewing automatically, if there is an existing record associated with the computer, a computer account in a directory service based on the existing record; creating automatically, if there is not an existing record associated with the computer, a new computer account in the directory service; installing automatically the image to the computer; and joining automatically the computer to directory service domain based on the newly created computer account or based on the renewed computer account.

In accordance with another embodiment, a computer readable medium, having installed thereon computer readable code which when executed, performs a method for installing an image on a computer is provided, comprises the steps: booting a computer from an image source; receiving first information from an end-user of the computer, wherein the first information is at least one unique identifier associated with the end-user; obtaining automatically second information associated with the end-user based on the first information; determining automatically if there is an existing record associated with the computer based on the second information; renewing automatically, if there is an existing record associated with the computer, a computer account in a directory service based on the existing record; creating automatically, if there is not an existing record associated with the computer, a new computer account in the directory service; installing automatically the image to the computer; and joining automatically the computer to directory service domain based on the newly created computer account or based on the renewed computer account.

In accordance with yet another embodiment, a method of installing an image on a computer is provided. The method comprising booting the computer from an image source; receiving first information from an end-user of the computer, wherein the first information is at least one unique identifier associated with the end-user; installing automatically the image to the computer; creating a Virtual Private Network connection with an organization; accessing an Intranet associated with the organization; obtaining automatically second information associated with the end-user based on the first information; determining automatically if there is an existing record associated with the computer based on the second information; renewing automatically, if there is an existing record associated with the computer, a computer account in a directory service based on the existing record; creating automatically, if there is not an existing record associated with the computer, a new computer account in the directory service; joining automatically the computer to directory service domain based on the newly created computer account or based on the renewed computer account.

These and other advantages and features of various embodiments of the present invention, together with the organization and manner of operation thereof, will become apparent from the following detailed description when taken in conjunction with the accompanying drawings, wherein like elements have like numerals throughout the several drawings described below. However, the accompanying drawings of the preferred embodiments of the invention are for explanation and understanding only and should not be taken to be limitative to the invention.

DETAILED DESCRIPTION OF THE PREFERRED EMBODIMENTS

Various embodiments provide systems and methods for a personal computer imaging solution which uses automation and background database calls for installing standard operating systems, installing applications, and providing end-user personalization. End-users simply enter minimal identification information and the rest of the process complexity is hidden from them. The process automatically creates or renews a computer name and computer account, automatically joins the computer to a directory service domain (e.g., Active Directory domain), and then automatically adds the end-user's account to appropriate local account groups. Furthermore, an end-user is allowed to image or re-image their computer over very slow network connections and even use remote access software during the process to conduct installation away from the office using a network connection that only has basic Internet connectivity.

Figure 1:
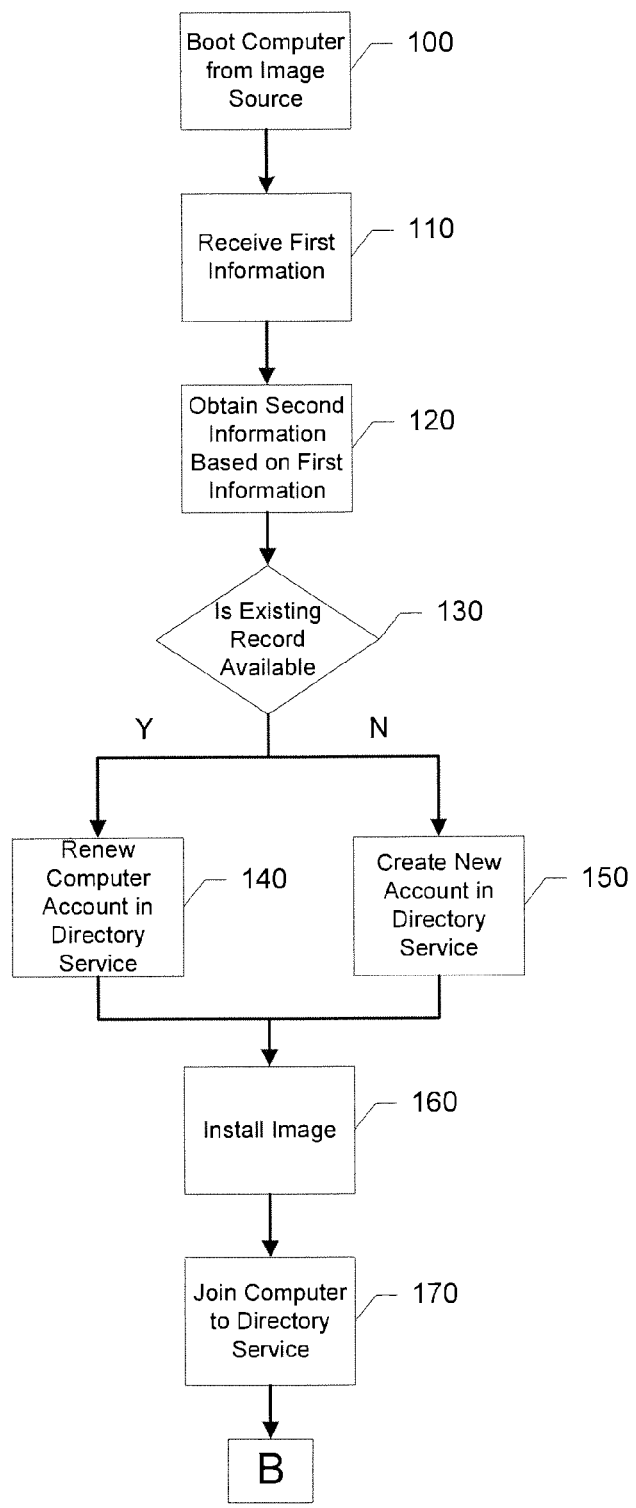
FIG. 1 is a flow chart illustrating processes performed in accordance with various embodiments.

Moreover, various embodiments of the present invention relate to an imaging process which spans a single image across all hardware platforms and provides a simple user-friendly interface to enable end-users to complete the imaging process without requiring assisted IT support. FIG. 1 shows a flow chart illustrating processes performed in accordance with one embodiment of the user-enabled desktop. At 100, the computer is booted from an image source. The computer is bootable from, for example, a CD-ROM, DVD-ROM disc, removable non-volatile memory (NVRAM) device such as USB key or smartcard, network-accessible server, or from a partition on the hard drive. After the image (e.g., Windows Preinstall Environment) is loaded, the imaging process may detect the hardware model from a BIOS string on the computer and take the necessary steps to setup for image installation on that platform. These steps may include, for example, checking for Intranet connectivity to determine if this is going to be an offline installation or a network installation. Such connectivity information may be useful in determining the order of future processes.

At 110, an interface requests first information from the end-user. The interface may be in the form of a front-end wizard type interface displayed on a screen or other interface which prompts the end-user to input first information. The first information may comprise at least one unique identifier associated with the end-user. For example, the first information may comprise an email address and/or domain password associated with the end-user. Additionally, the first information may comprise an Employee Identifier, Employee number, identification code, a user login name, Single Sign On credentials, a digital certificate, or other unique user token. Still further, the first information may be any unique user identifier or authentication method for establishing the individual's identity that can then be used to retrieve secondary information necessary for completion of the imaging and configuration process.

Furthermore, it is contemplated that the interface may present the end-user with the option of choosing other options and/or settings. For example, the end-user may be prompted to select an image location. An image location may be an image on local media, such as a DVD or hard drive. This local media image could be used when the user has a slow network connection or no network connection. Alternatively, there could be a newer image accessible from a server on the Internet or Intranet. When the user has a suitable network connection, the user could install the latest image version via the Internet or Intranet. Multiple server sources may be used so that the imaging program could automatically select from, or the user could manually select from, the nearest available image that is currently available and will enable the fastest installation. Accordingly, the user may be allowed to select another image copy from an image bootup source that may be on, for example, a hard drive or available from one or more network-accessible servers. The image copy may contain a copy not only of the bootup environment but also the image itself.

Furthermore, the end-user may be prompted to select a preferred language or to select business-specific applications and settings. Still further, it is contemplated in one embodiment that a check may be automatically conducted to determine if there are hot fixes, hardware specific applications, drivers, and settings to slipstream into the installation process.

At 120, second information is automatically obtained based on the first information provided previously by the end-user in 110. Similar to the first information, the second information is also associated with the end-user. However, the second information may be more detailed information associated with an end-user that is stored in a database. This process may use the first information to pull end-user details from, for example, an enterprise database associated with an organization. End user details may be information such as the end-user's full name, time zone, computer serial number, organization name, computer name, list of the user's previously installed applications, list of the user's previously installed applications, list of organizations or group-specific applications assigned to the user, previously saved configuration settings, and user preferences. Furthermore, the end user details may be configuration details such as server name or their data required by certain client/server applications that are delivered as part of the image to function properly for the specific user. As such, in some embodiments the process enables the automatic retrieval of detailed information associated with an end-user by simply requesting the user to provide a minimal amount of identification information.

Therefore, the end-user is not required to conduct the cumbersome task of inputting and determining detailed information which may already be stored in a database associated with an organization. As one of ordinary skill in the art would understand, such a task may require significant time and assistance from IT personnel.

With regard to obtaining the second information based on the first information, it is contemplated in this embodiment that the user has current Intranet connectivity to enable access to, for example, an enterprise database. However, in situations where Intranet connectivity is not available, other embodiments of the current solution enable delaying the obtaining of the second information until Intranet connection is available via, for example, a Virtual Private Network (VPN) connection. Details related to such embodiments are discussed in greater detail below.

At 130, the process determines if there is an existing record associated with the computer based on the second information. For example, a database call may be automatically sent to query an asset management database to determine whether or not there is an existing asset management record for the computer's serial number. If there is an existing record associated with the computer, at 140, the process automatically renews a computer account in a directory service (e.g., Active Directory) based on the existing record using the existing computer name. As discussed herein, a directory service may encompass a centralized and standardized system that automates network management of user data, security, or distributed resources, and enables interoperation with other directories. The above-discussed renewal of a computer account in the directory service may be conditional on confirming that the existing record and the owner matches the supplied end-user credentials or first information. In addition, an enterprise tool may be called in this step to renew the account in the directory service. If there is not an existing record associated with the computer, at 150, the process automatically creates a new computer account in the directory service. The new computer account may be created in one embodiment by an enterprise tool in the directory service. Additionally, database calls may be used in some embodiments to pull user-specific information useful in personalizing the image. For example, an end-user's computers common operating environment (COE) share may be queried and configured. In general, a COE specifies a common IT architecture within an organization and promotes interoperability and cross-platform capabilities among an organization's devices. All workstations within an organization may run the same software and use the same interfaces so that its devices are standardized and information presentation and platform interfaces are consistent throughout the organization.

It should be noted that, in some embodiments, the directory service may be an enterprise directory computer management and access software. Furthermore, in some embodiments, no directory service or enterprise directory computer management and access software is used at all. In these embodiments, the processes associated with the directory service or enterprise directory computer management and access software may be left out of the imaging process.

The setup information and customization information obtained and discussed above may be compiled into a tool to automate the following processes of the installation process. For example, all of the setup information and customization information obtained and discussed above (e.g., end user's full name, end user's time zone, end user's directory service username, and/or end user's directory service computer name) may be input into a system preparation tool (e.g., Microsoft's Sysprep tool—sysprep.inf for Windows XP or unattend.xml for Windows Vista) and may be used to automate the following processes of the installation process.

At 160, the image is applied or installed. This image installation comprises launching an imaging tool to install the image. The imaging tool may be an industry standard imaging tool such as, for example, Altris, Symantec, or Ghost. The image location may have been previously selected by the user or may have been automatically selected. With the newly applied image, the system preparation process customizes the image and joins the computer to the directory service domain or the like at 170, thereby leveraging the previously created computer account if Intranet connectivity is present. Otherwise, if Intranet connectivity is not available, the process of joining the computer to the directory service domain or the like is postponed until later.

Figure 2:
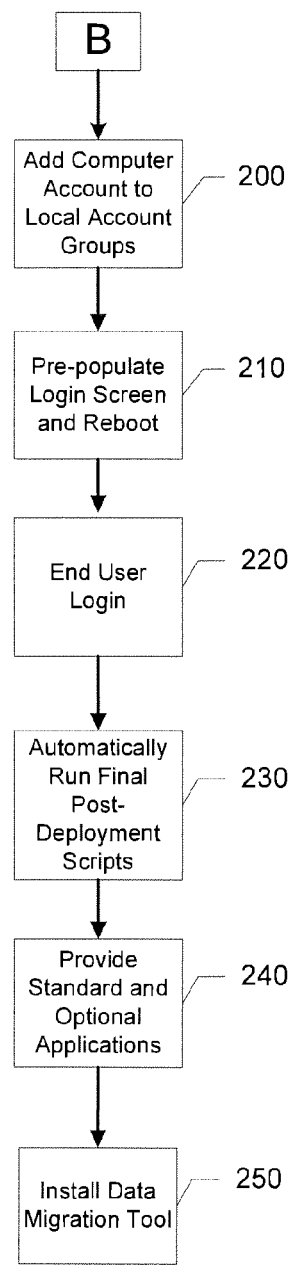
FIG. 2 is a flow chart illustrating processes performed in accordance with various embodiments.

At this point, the computer may reboot and load the operating system (OS). FIG. 2 is a flow chart illustrating processes that may be performed in various embodiments after the computer reboots.

During the first boot of the operating system, the computer automatically conducts a plurality of processes. Specifically, the computer automatically logs in using a local administrator account and runs post-deployment scripts that are configured to install hardware-specific applications. For example, the hardware-specific applications may be for touchpad software, Bluetooth utilities, or DVD software. Additionally, the computer may apply settings specified by the system preparation tool (e.g., Sysprep). Still further, at 200, the end-user may, in one embodiment, be added to local computer groups, such as Administrator or Power Users.

At 210, if connected to the Intranet, the next login screen is pre-populated for the end-user and the computer automatically reboots. At 220, the end-user is now ready to login for the first time. As discussed in greater detail below, for an end-user with only general Internet connectivity, a VPN session may be initiated and thereby enable the end-user to join the domain, and login for the first time to create the initial user profile.

At 230, final post-deployment scripts may be automatically run in the background to thereby apply settings or install applications that require pre-existence of the user's profile as a pre-requisite. At 240, the software management solution may then provide network based standard and optional applications. For example, some examples of applications that may be forcefully or optionally installed from the image source or from a network based location are operating system patches, application patches or new versions, Microsoft Office, SAP GUI, instant messaging software, PDA connectivity/synchronization software, sales software, customer support software, financial software, system utilities such as WinZip or disk defragmenting tools, and database query/reporting tools.

At 250, a data migration tool may be installed which leverages, for example, Microsoft's User State Migration Tool, to automatically copy data and settings from an old computer to the new computer. The end-user may then be guided through installation of the data migration tool on both computers, and will be instructed to connect both computers via network cable so that the data migration tool can copy data and settings to be applied on the new computer.

Figure 3:
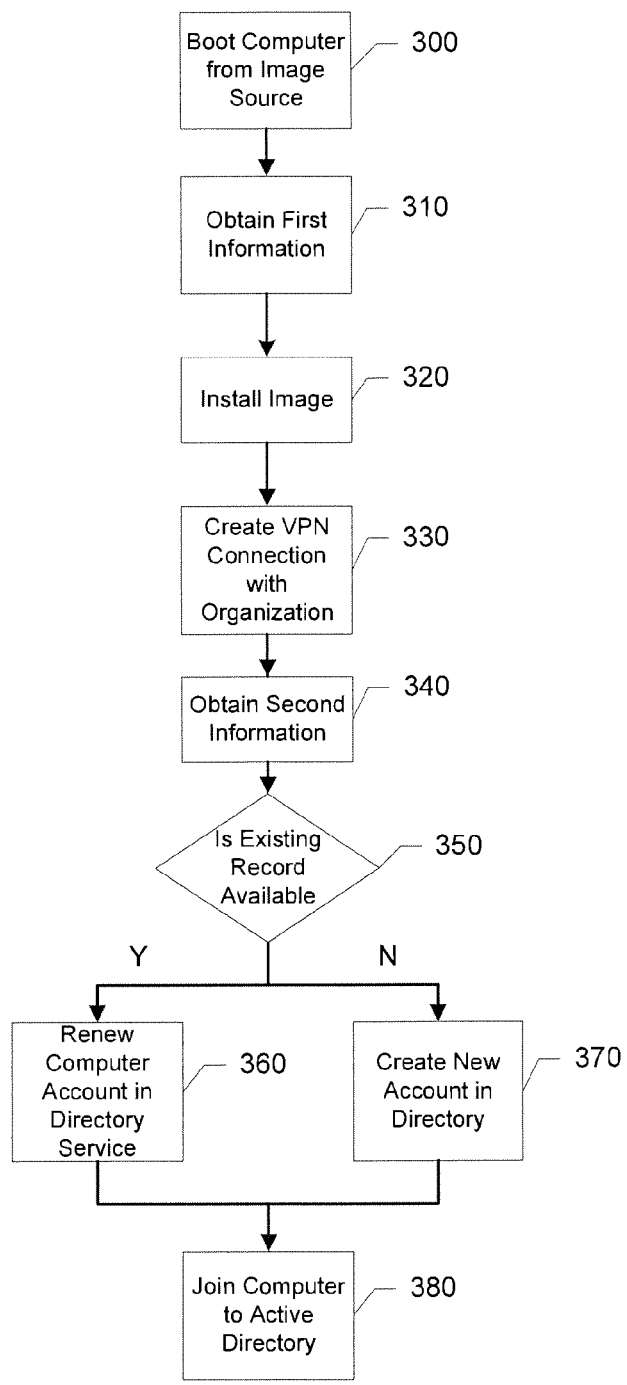
FIG. 3 is a flow chart illustrating processes performed in accordance with various embodiments.

FIG. 3 is a flow chart illustrating processes that may be performed in various embodiments in situations when Intranet connectivity is not initially available. Similar to the above discussed processes, this process also enables imaging and personalization to be completed in a user friendly manner and with minimal IT support. In particular, it is contemplated that if an Intranet connection is not available upon receipt of first information, then the processes of obtaining the second information, creating a computer account, and creating a user profile are delayed until the image is installed and completed to the point where a VPN connection can be created. Once this VPN connection is created, the processes that were delayed are performed with a remote connection to the organization's Intranet.

It is noted that VPN, as described herein, is intended to encompass at least a private network that uses a public network (e.g., the Internet) to connect remote sites or users together. Instead of using a dedicated, real-world connection such as leased line, a VPN may use "virtual" connections routed through the Internet from the company's private network to the remote site or employee.

As illustrated at 300 in FIG. 3, the method is initiated by booting a computer from an image source. The computer is booted in the same manner as described in detail above. At this point, an interface can be configured to receive first information from an end-user of the computer, as illustrated in 310. The first information may be at least one unique identifier associated with the end-user. For example, the first information may comprise an email address and/or domain password associated with the end-user. Further examples of first information have been discussed in detail above. At 320, the image is installed to the computer.

At 330, a VPN connection is created between the end-user's computer and the organization, thereby enabling access to the Intranet. This VPN connection may be created by instructing the user to access VPN software via an icon on the desktop. The user may make a connection, and then initiate the rest of the configuration process (as discussed below) once the VPN connection is made. A first VPN connection may be directed to joining the domain. An additional VPN connection (after rebooting the PC) may be required to check for patches and other application updates. Although, user interaction is discussed above, it is contemplated that the installation process may automatically initiate the VPN connection and continue the installation process automatically once the VPN connection has been established. Furthermore, it is contemplated that application updates and all other settings may be delivered over the Internet without requiring a VPN connection.

At 340, once a VPN connection is established, second information associated with the end-user may be automatically obtained based on the first information.

At this point, the process follows a process similar to the process described in detail above. For instance, at 350, the process determines if there is an existing record associated with the computer based on the second information. For example, a database call may be automatically sent to query an asset management database to determine whether or not there is an existing asset management record for the computer's serial number. If there is an existing record associated with the computer, at 360, the process automatically renews a computer account in a directory service based on the existing record using the existing computer name. This renewal may be conditional on confirming the existing record and the owner matches the supplied end-user credentials. In addition, an enterprise tool may be called to renew the account in the directory service. If there is not an existing record associated with the computer, at 370, the process automatically creates a new computer account in the directory service. The new computer account may be created by an enterprise tool in the directory service. Additionally, database calls may be used to pull user-specific information useful in personalizing the image.

All of the above discussed setup information and customization information is compiled into a system preparation tool to automate the following processes of the installation process. For example, Microsoft's Sysprep tool (sysprep.inf for Windows XP or unattend.xml for Windows Vista) may be used to automate the following processes of the installation process.

At 380, the system preparation process may customize the image and may join the computer to the directory service domain, at 380, thereby leveraging the previously created computer account. From here, the process follows the same process described above with respect to FIG. 2.

Figure 4:
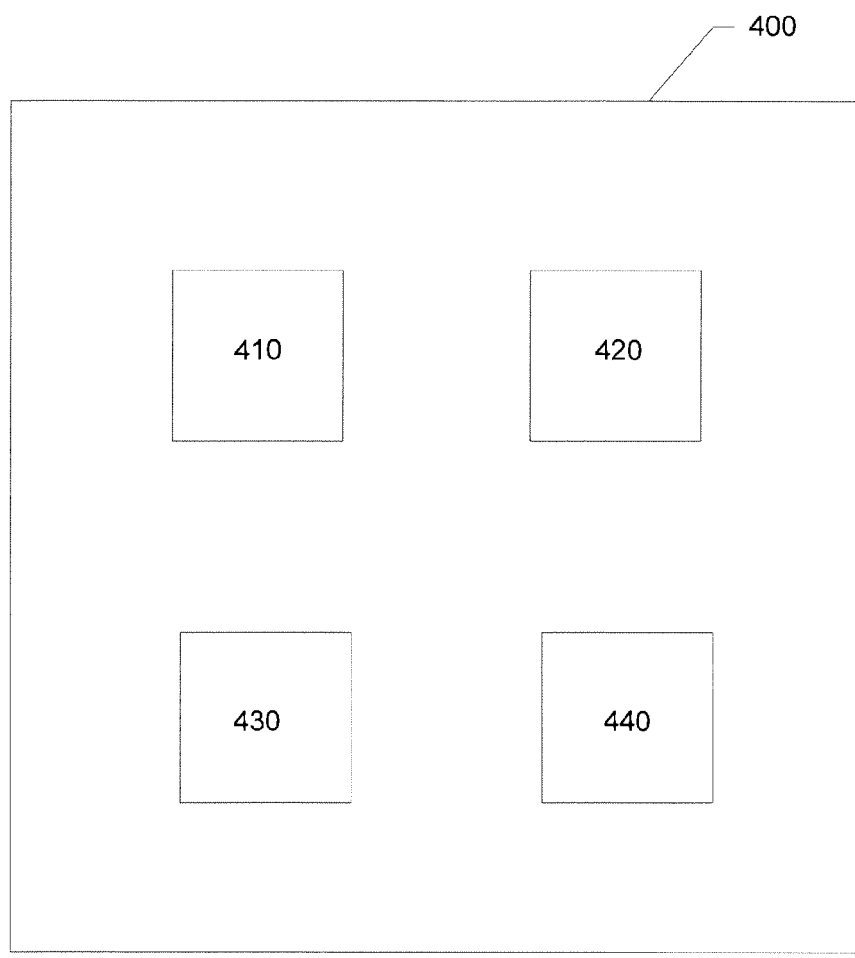
FIG. 4. is an overview diagram of a system within which various embodiments of the present invention may be implemented.

FIG. 4 is an overview diagram of a system within which various embodiments of the present invention may be implemented. An exemplary system for implementing the portions of the invention includes a computing device 400 in the form of a computer, including a processing unit 410, a system memory 420, and a system bus that couples various system components including the system memory to the processing unit. The computing device 400 may also include an interface 430, such as a display, keyboard, or mouse, electronically coupled to an input/output unit 440. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a DVD-ROM, CD-ROM or other optical media. The drives and their associated computer-readable media provide nonvolatile storage of computer-executable instructions, data structures, program modules and other data for the computer. The invention in one embodiment will be described in the general context of computer-executable instructions, such as program modules, being executed by a computer. Such program code or software means may be stored on the hard disk, magnetic disk, optical disk, ROM or RAM, and may include an operating system, one or more application or software programs, other program modules, and program data.

Embodiments within the scope of the present invention also include computer-readable media for having computer-executable instructions or data structures stored thereon and also known as software. Such computer-readable media can be any available media, which can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer. Computer-executable instructions comprise, for example, instructions and data which cause a general purpose computer, special purpose computer, or special purpose processing device to perform a certain function or group of functions. Computer-executable instructions may also be properly termed "software" as known by those of skill in the art.

Accordingly, various embodiments of the present invention enable consistent installation of the operating system, standard applications, settings, and patches in a manner that brings all the necessary components together to enable a comprehensive solution that is scalable to an enterprise distributed environment. The process can be completed by an average end-user without necessarily requiring assisted IT support and is adaptable to multiple methods of network connectivity. Furthermore, various embodiments leverage the speed of basic imaging solutions while maintaining the flexibility of more customized imaging solutions.

Such a solution is highly effective in large distributed organizations such as, for example, banks, convenience stores, and department stores.

Moreover, the automation in some embodiments improves the overall end-user experience, reduces downtime for the end-user during new computer setup or computer migration, and/or reduces IT support costs. Since complexity is hidden from the end-user, the process of applying and personalizing an image may be conducted with minimal user interaction and without requiring assisted IT support. This enables the organization to lower IT support costs by removing the end-user's dependency on on-site and any other assisted IT support.

It should be noted that although a simplified user interface is generally presented to the user, it is contemplated that an option be provided so that an advanced user may check and modify user settings.

It should also be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software for the present invention could be accomplished with programming techniques with rule based logic and other logic to accomplish the various correlation steps, comparison steps and decision steps. It should also be noted that the word "component" as used herein and in the claims is intended to encompass implementations using one or more lines of software code, and/or hardware implementations, and/or a combination thereof.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method comprising:
    booting a computer;
    after booting the computer:
        receiving first information from an end-user of the computer, wherein the first information is at least one unique identifier associated with the end-user;
        obtaining automatically second information associated with the end-user based on the first information as has been received from the end-user, wherein the second information includes configuration details used for completion of an imaging and configuration process;
        determining automatically if there is an existing record associated with the computer based on the second information as has been automatically obtained;
        after determining automatically:
            renewing automatically, if there is an existing record associated with the computer, a computer account in a directory service based on the existing record;
            creating automatically, if there is not an existing record associated with the computer, a new computer account in the directory service;
            after renewing or creating automatically, joining automatically the computer to directory service domain based on the newly created computer account or based on the renewed computer account.

2. The method of claim 1, further comprising:
    adding automatically the computer account of the end-user to one or more local account groups.

3. The method of claim 2, further comprising:
    creating automatically a local user profile on the computer so that the end-user can logon to the computer with a domain account of the end-user whether connected or disconnected from an Intranet associated with an organization.

4. The method of claim 3, wherein the computer is configured to access the Intranet associated with the organization via a Virtual Private Network.

5. The method of claim 1, wherein the second information is obtained automatically from an enterprise database associated with the organization and does not require end-user input.

6. The method of claim 1, further comprising, after booting the computer, configuring the computer by one or more of: running a script and applying settings.

7. The method of claim 6, further comprising, after configuring the computer, rebooting the computer.

8. The method of claim 1, wherein the first information comprises an email address and a domain password.

9. A non-transitory computer readable medium, having installed thereon computer readable code which when executed, performs a method comprising:
    booting a computer;
    after booting the computer:
        receiving first information from an end-user of the computer, wherein the first information is at least one unique identifier associated with the end-user;
        obtaining automatically second information associated with the end-user based on the first information as has been received from the end-user, wherein the second information includes configuration details used for completion of an imaging and configuration process;
        determining automatically if there is an existing record associated with the computer based on the second information as has been automatically obtained;
        after determining automatically:
            renewing automatically, if there is an existing record associated with the computer, a computer account in a directory service based on the existing record;
            creating automatically, if there is not an existing record associated with the computer, a new computer account in the directory service;
            after renewing or creating automatically, joining automatically the computer to directory service domain based on the newly created computer account or based on the renewed computer account.

10. The non-transitory computer readable medium of claim 9, further comprising:
    automatically adding the computer account of the end-user to one or more local account groups.

11. The non-transitory computer readable medium of claim 9, further comprising:
    creating automatically a local user profile on the computer so that the end-user can logon to the computer with a domain account of the end-user whether connected or disconnected from an Intranet associated with an organization.

12. A method comprising:
    booting a computer;
    after booting the computer:
        receiving first information from an end-user of the computer, wherein the first information is at least one unique identifier associated with the end-user;
        creating a Virtual Private Network connection with an organization;
        accessing an Intranet associated with the organization;
        obtaining automatically second information associated with the end-user based on the first information as has been received from the end-user, wherein the second information includes configuration details used for completion of an imaging and configuration process;
        determining automatically if there is an existing record associated with the computer based on the second information as has been automatically obtained;
        after determining automatically:
            renewing automatically, if there is an existing record associated with the computer, a computer account in a directory service based on the existing record;
            creating automatically, if there is not an existing record associated with the computer, a new computer account in the directory service;
            after renewing or creating automatically, joining automatically the computer to directory service domain based on the newly created computer account or based on the renewed computer account.

13. The method of claim 12, further comprising:
adding automatically the computer account of the end-user to one or more local account groups.

14. The method of claim 13, further comprising:
creating automatically a local user profile on the computer so that the end-user can logon to the computer with a domain account of the end-user whether connected or disconnected from an Intranet associated with an organization.

15. The method of claim 12, further comprising, after booting the computer, configuring the computer by one or more of: running a script and applying settings.

16. The method of claim 15, wherein configuring the computer comprises running a script.

17. The method of claim 15, wherein configuring the computer comprises applying settings.

18. The method of claim 15, further comprising, after configuring the computer, rebooting the computer.

* * * * *